United States Patent [19]
Magorien

[11] 3,778,092
[45] Dec. 11, 1973

[54] FRONT END LOADING-SELF LOCKING FEMALE COUPLING

[75] Inventor: Vincent G. Magorien, Granada Hills, Calif.

[73] Assignee: Seaton-Wilson Incorporated, Burbank, Calif.

[22] Filed: Sept. 20, 1971

[21] Appl. No.: 182,049

[52] U.S. Cl..............................285/316, 285/39,
[51] Int. Cl.............................................. F16l 37/18
[58] Field of Search........................................ 138/39
   285/316, 315, 314

[56] References Cited
   UNITED STATES PATENTS
   3,334,659  8/1967  Magorien............................ 138/39
   2,409,811  10/1946  Taylor et al. .................... 285/316 X Primary Examiner—James R. Boler
Assistant Examiner—Wayne L. Shedd
Attorney—Fulwider, Patton, Rieber, Lee & Utecht

[57] ABSTRACT

A female connector for fluid carrying lines which is assembled from its front end and in which the internal components are self-locking. All internal components are inserted from the front end of the female connector. A special tool inserted from the back end of the connector body then draws back one of the internal elements, allowing all of the internal components to be fully inserted. Release of the internal element by the special tool forces a plurality of locking balls outwardly, causing the internal components to lock within the female connector.

16 Claims, 5 Drawing Figures

PATENTED DEC 11 1973　　3,778,092
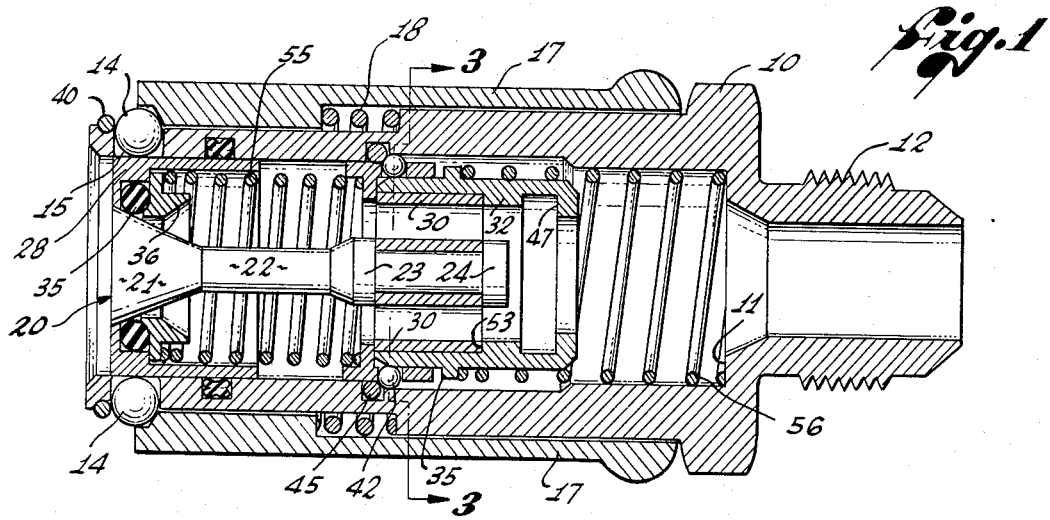
Fig. 1
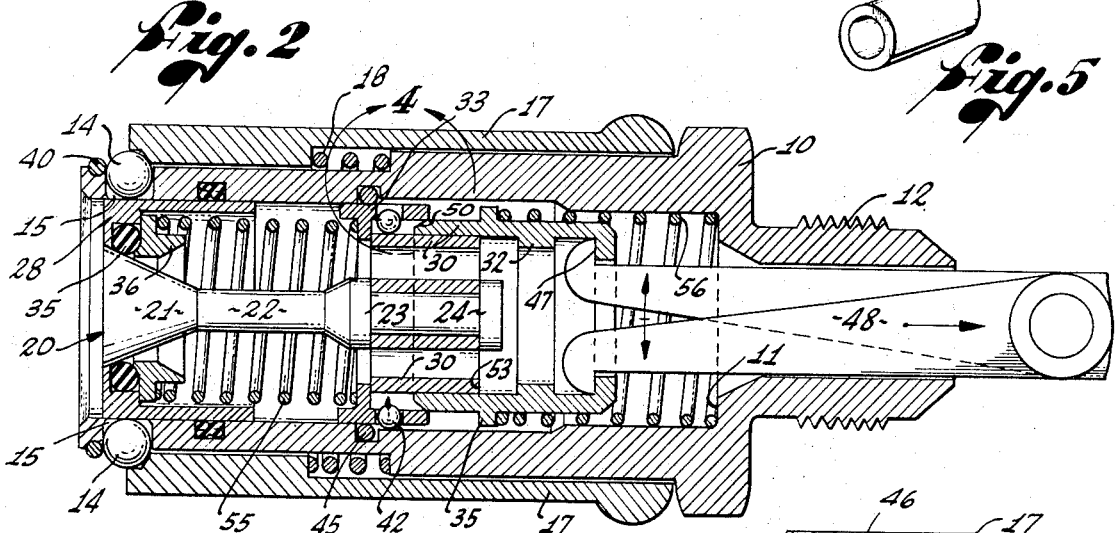
Fig. 2
Fig. 5
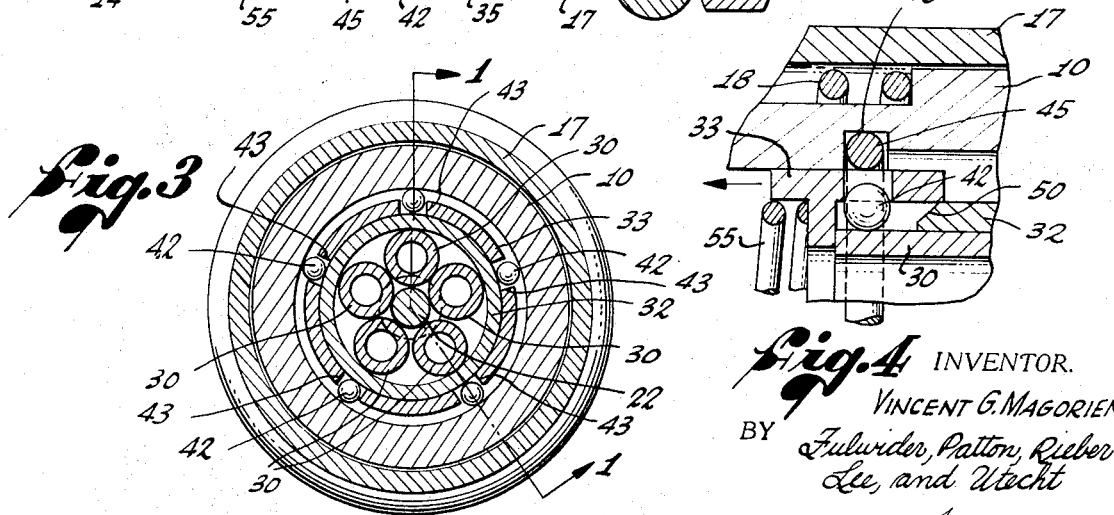
Fig. 3
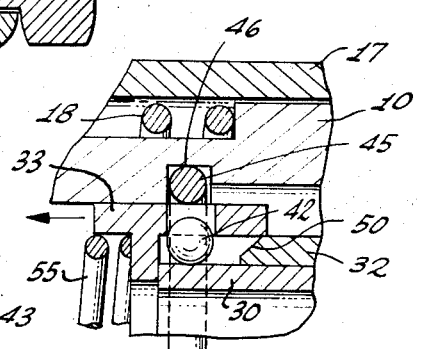
Fig. 4
INVENTOR.
VINCENT G. MAGORIEN
BY Fulwider, Patton, Rieber
Lee, and Utecht
ATTORNEYS

FRONT END LOADING-SELF LOCKING FEMALE COUPLING

BACKGROUND OF THE INVENTION

This invention relates to fluid coupling devices and, more particularly, to an improved female coupling for fluid carrying lines.

As is well known, there are many types of fluid handling apparatus wherein a source of fluid under pressure must be connected and disconnected to other fluid handling devices. Typical of such apparatus are hydraulic systems utilizing petroleum derivatives of various types.

In U.S. Pat. No. 3,334,659 for Flow Stream Immersed Supporting Structure, I disclosed a male and female connector for coupling two fluid carrying lines. The essential feature of that invention was the supporting structure of the components within each connector. This invention constitutes an improvement over connectors of that type.

In connectors of that type, the outer housing generally comprises two to three tubular elements. Generally, the internal components must be inserted from the rear of the connector and held in place by a threaded plug. It is, of course, advantageous to minimize the number of component parts in a connector, particularly where over-all cost is an important factor. Also, manufacturing costs are improved when the number of certain manufacturing operations, such as thread cutting, are held to a minimum.

One of the disadvantages in the prior art connectors lies in the use of a threaded plug to hold the assembled connector components in place. In use, the connector may be accidentally turned in such a way that the threaded plug becomes unscrewed. Since the internal components are generally under heavy spring loading, the connector may fly apart with considerable force, creating a possible hazard to personnel.

SUMMARY OF THE INVENTION

In accordance with this invention, provision is made for a female connector in which all internal components are inserted through the front end of the female connector body. One of the internal elements is provided with a plurality of locking balls spaced around its periphery. The locking balls are held in an outer position after the internal components are assembled. After the internal components are partially inserted through the front end of the connector, a special tool is inserted through the back end of the connector and used to pull a portion of the internal elements toward the rear of the connector. As a result, the locking balls travel inwardly, allowing the entire cartridge of internal components to be fully inserted within the female connector body. When the special tool is withdrawn, the locking balls are cammed outwardly, where they lock against a snap ring set in an internal groove of the female connector. Disassembly may be carried out in a reverse manner.

As a result of the design of the female connector according to this invention, the internal elements are locked in place without the use of a threaded plug. Accordingly, the connector components may not be accidentally disassembled or unscrewed during normal use.

Further, front end loading results in a substantial savings in assembly time. As assembly time directly affects connector cost, this is a considerable advantage.

The design of the female connector has decreased the number of principle body parts to one, compared with greater numbers in most connectors of the prior art. This also, of course, serves to decrease the cost of manufacture.

When the locking balls are cammed outwardly, they bear, in most embodiments of this invention, against a hardened snap ring. Use of the snap ring allows use of softer material for the connector body. As a result, the body is easier to form and work.

Finally, the connector design in accordance with this invention employs fewer threaded parts. This also results in a savings of manufacturing cost.

BRIEF DESCRIPTION OF THE DRAWINGS

FIG. 1 is a cross-section of this invention, illustrating the locking balls utilized in a female connector similar to that of my U.S. Pat. No. 3,334,659;

FIG. 2 is a further cross-section of the invention, illustrating the use of a special tool to cause retraction of the locking balls which allows the internal connector components to be fully inserted;

FIG. 3 is a cross-section taken along the line 3—3 of FIG. 1, illustrating the mounting of the locking balls and the tubular supports;

FIG. 4 is an enlarged cross-section of the area 4 of FIG. 2, illustrating the relationship of the locking balls and the snap ring against which they bear; and, FIG. 5 is a perspective view of one of the tubular guides used in the connector of FIG. 1.

DESCRIPTION OF THE PREFERRED EMBODIMENT

As depicted in the drawings for pusposes of illustration, the invention is shown in combination with a female connector like that disclosed in my U.S. Pat. No. 3,334,659. Since the female connector is described in detail in that patent, it will only be described briefly here in connection with FIGS. 1 and 2.

A tubular member 10 forms the main connector body. As will be described, the tubular member is provided with various internal recesses and an internal shoulder 11 at its rear. A male thread 12 is provided at the rear of the tubular member for connection to a fluid line (not shown).

At the front of the tubular member 10, a plurality of balls 14 are seated in pockets 15 located around the periphery of the body. Bearing against the balls 14 is an axially slidable sleeve 17 urged against the balls by a sleeve spring 18.

A valve 20 is comprised of a conical valve head 21 and a valve stem 22. Toward the rear of the stem 22, two circular collars 23, 24 are provided. A valve poppet member 28, including rubber sealing ring 35 and poppet washer 36, acting in conjunction with the valve head 21, serve to stop the flow of any fluid under pressure within the connector.

Arranged about the valve stem 22 and in between the collars 23 and 24 are a plurality of tubular guides 30. As explained in my prior patent, the purpose of the tubular guides is to provide a support for the internal elements of the valve while allowing liquid flow therethrough. Since the tubular elements 30 are held between the collars 23, 24, no axial movement relative to the valve stem is possible.

As will be explained in detail below, tubular guides 30 are surrounded by two axially movable bodies, a tube guide housing 32 and a thrust bearing 33. A relatively heavy spring 55 urges the poppet member 28 away from the tubular guides 30, serving to maintain the fluid seal of the valve head against the sealing ring 35. A relatively light spring 56, seated on internal shoulder 11 of the tubular member 10, urges the tube guide housing 32 and thrust bearing 33 forward.

No male connector is disclosed herein. However, my above referenced patent discloses a male connector suitable for use with the female connector disclosed. To insert the connector shown in my prior patent, it is pushed against the poppet member 28. Since the front spring 55 is heavier than the rear spring 56, all internal components of the female connector will be pushed rearwardly by the male connector toward the rear connector shoulder 11. When the thrust guide housing 32 bottoms against the shoulder 11, the spring 55 begins to deflect, breaking the seal between the valve head 21 and the sealing ring 35. This deflection continues until the balls 14, cammed inwardly by the action of the sleeve 17; drop into a retaining groove within the inserted male connector. At this point, the male and female connectors are locked together. After the balls 14 move inwardly into the retaining groove in the male connector, the sleeve 17 is free to move forward against a snap ring 40. Since the balls 14 may not now move outwardly because of the sleeve 17, the male and female connectors are locked together until the sleeve 17 is withdrawn against the action of the sleeve spring 18, allowing the balls 14 to move outwardly.

The above brief description relates to those parts which are found in the female connector of my previously referenced patent. As described in that patent, all of the internal components of the female connector must be assembled from the rear of the connector and held in place by a threaded plug inserted in the male connector member. In accordance with this invention, all of the internal components of the female connector may be assembled from the front end of the connector. In addition, no threaded element is needed to hold the internal components in place.

Referring to the figures, the tubular guides 30 are held in place between the collars 23, 24 of the valve stem 22 and the internal walls of the tube guide housing 32. As is shown best in FIGS. 1 and 2, the tube guide housing 32 is limited in its forward movement relative to the tubular guides by an internal shoulder 53. Its movement rearwardly of the tubular guides, however, is limited only by the rear internal shoulder 11 of the female connector member 10. Spring 56, which rests against the annular shoulder 11 of the tubular member 10, bears against an annular ring 35 of the tube guide housing 32, serving to maintain it in the position shown in FIG. 1, that is, in a forward position against the ends of tubular guides 30.

Concentric with and mounted around the forward end of the tube guide housing 32 is the thrust bearing 33. As seen best in FIG. 4, the thrust bearing serves as a seat for the heavy spring 55 and bears against the forward ends of the tubular guides 30. As seen best in FIG. 3, the thrust bearing 33 is provided with a number of locking balls 42, equal in number to the number of tubular guides 30, arranged in holes 43 spaced around the periphery of the thrust bearing. In an assembled and valve-closed condition, as shown in FIG. 1, the tube guide housing 32 is in its extreme forward position, serving to cam the locking balls 42 outwardly against a snap ring 45 set within an internal groove 46 (FIG. 4) of the tubular member 10. As shown in FIG. 1, so long as the locking balls 42 are cammed outwardly to their locking position by the tube guide housing 32, the internal components may not be removed from the connector. However, as shown best in FIGS. 2 and 4, if the tube guide housing 32 is drawn to the rear of the tubular member 10, the locking balls 42 are allowed to move inwardly to rest against the outer surfaces of the tubular guides 30. This drops the locking balls from their contact with the snap ring 45, allowing the internal components of the female connector to be removed.

Generally, it is advantageous to utilize the snap ring 45 as a surface against which the locking balls may bear. By hardening the snap ring itself, the connector body may be made of a relatively soft material. However, it some times happens; particularly with smaller connectors, that it is desirable to delete the snap ring. In such a case, the connector body may be made of a hardened material and the locking balls allowed to bear against an internal shoulder of the connector body.

Assembly of the female connector according to this invention is accomplished as follows. First, the internal valve components consisting of all parts internal to the tubular member 10 are assembled about valve 20. The assembled parts are inserted into the tubular member 10 until the locking balls strike the front of the member. A special hooked tool 48, as shown in FIG. 2, is inserted into the rear of the tubular member, and is used to grasp the tube guide housing 32 by an internal groove 47 provided for that purpose. By drawing the tube guide housing 32 toward the rear of the tubular member 10, locking balls 42 are allowed to move inwardly. Thereafter, the internal components may be manually inserted into the tubular body to the approximate position shown in FIG. 2. As the tube guide housing 32 is then allowed to travel forwardly by the action of the spring 56, its front chamferred surface 50 (FIG. 4) bears against each of the locking balls and thrusts them outwardly to the position shown in FIG. 1. The internal components are then urged forwardly by the rear spring 56 until the locking balls bear against the snap ring 45. The internal components of the female connector are thus locked within the tubular body until the tube guide housing 32 is drawn rearwardly in relation to the thrust bearing 33 to again release the locking balls from their outward position. Accordingly, the internal parts of the connector valve are locked in place without the base of threaded connections.

It will be apparent from the foregoing that, while a particular form of a fluid connector has been illustrated in connection with this invention; other types of connectors or other devices may be successfully utilized. In addition; various modifications to the invention can be made without departing from the spirit and scope of the invention.

I claim:

1. In a structure for locking and unlocking elements in a fluid flow stream, the combination comprising
    body means having a fluid passage therethrough including first and second internal shoulders,
    means restrained for axial movement within said body means,
    locking means mounted on said restrained means for movement transverse to said axial movement from a first position clear of said first shoulder to a second position in abutment with said first shoulder, and, cam means for forcing movement of said locking means to said second position.

2. The combination of claim 1, further comprising means abutting said second shoulder for urging said cam means toward said first shoulder.

3. The combination of claim 1, wherein said restrained means includes holes having axes transverse to said axial movement for mounting said locking means.

4. The combination of claim 1,
wherein said restrained means includes holes having axes transverse to said axial movement for mounting said locking means, and,
further comprising means abutting said second shoulder for urging said cam means toward said first shoulder.

5. The structure of claim 4, wherein
said restrained means comprises a first hollow cylindrical member having an outside diameter slightly less than the internal diameter of said body means at said first shoulder, and,
said cam means comprises a second hollow cylindrical member sized for axial movement within said first hollow member.

6. The combination of claim 5, wherein said urging means comprises a spring.

7. The combination of claim 6, further comprising means for limiting the movement of said locking means from said second position to said first position.

8. The combination of claim 7, wherein said locking means comprises balls sized to pass through the holes in the sides of said first hollow cylindrical member.

9. In a structure for locking and unlocking elements in a fluid flow stream, the combination comprising,
a tubular member having a passage therein for fluid flow therethrough and having first and second internal annular shoulders,
a first hollow cylindrical member having an outside diameter slightly less than the internal diameter of said first annular shoulder,
a second hollow cylindrical member sized for axial movement within said first hollow member, said second member having a tapered end,
locking means mounted on said first hollow member for movement transverse to said axial movement from a first position clear of said first annular shoulder to a second position in abutment with said first annular shoulder, and,
spring means mounted in abutment with said second annular shoulder for urging said second hollow member toward said first annular shoulder so that said tapered end forces movement of said locking means from said first position to said second position.

10. The combination of claim 9, wherein
said first hollow member includes radial holes in its sides, and,
said locking means comprises balls mounted for radial movement in said holes.

11. The combination of claim 10, further comprising means for limiting the movement of said locking balls from said second position to said first position.

12. In a structure for locking valve elements within a tubular element for use in a fluid flow stream, the combination comprising
a tubular member having a passage therein for fluid flow therethrough and having first and second internal annular shoulders,
a hollow cylindrical member mounted for axial movement within said tubular member past said first annular shoulder,
locking means mounted on said hollow cylindrical member for movement transverse to said axial movement from a first position clear of said first annular shoulder to a second position in abutment with said first annular shoulder, and,
cam means for forcing movement of said locking means to said second position.

13. The combination of claim 12, further comprising means abutting said second annular shoulder for urging said cam means toward said first annular shoulder.

14. The combination of claim 12, wherein,
said hollow cylindrical member includes radial holes in its sides, and,
said locking means comprising balls mounted for radial movement in said holes.

15. The combination of claim 14, further comprising spring means abutting said second annular shoulder for urging said cam means toward said first annular shoulder.

16. In a structure for locking valve elements within a connector for use in a fluid flow stream, the combination comprising
a cylindrical connector body member having a passage therein for fluid flow therethrough and having a first internal annular shoulder at one end and a second internal annular shoulder separated from said first shoulder,
first and second axially movable concentric cylinders sized to pass within said first annular shoulder, said first cylinder having holes spaced about its periphery,
locking balls in said holes sized for movement from a first position clear of said first shoulder to a second position in abutment with said first shoulder, and,
a spring means in abutment with said second annular shoulder and said second cylinder so as to urge said second cylinder toward said first annular shoulder to force said balls to said second position.

* * * * *